United States Patent [19]

August

[11] Patent Number: 4,565,181

[45] Date of Patent: Jan. 21, 1986

[54] INTERNAL COMBUSTION ENGINE WITH ONE OR MORE COMPRESSION CAPS BETWEEN PISTON AND CYLINDER HEAD AND DEFLECTION MEANS IN THE COMBUSTION CHAMBER THROUGH WHICH ROTARY FLOW IS INDUCED IN THE CHARGE

[76] Inventor: Paul August, C/ Capellades 1, Barcelona 6, Spain, 6

[21] Appl. No.: 110,935

[22] Filed: Jan. 10, 1980

Related U.S. Application Data

[63] Continuation of Ser. No. 855,690, Nov. 29, 1977, abandoned.

[51] Int. Cl.$^4$ ............................................. F02B 23/00
[52] U.S. Cl. .................................. 123/661; 123/193 P
[58] Field of Search ........ 123/191 R, 191 M, 193 CP, 123/193 P, 193 R, 661, 193 H

[56] References Cited

U.S. PATENT DOCUMENTS

| | | | |
|---|---|---|---|
| 2,736,306 | 2/1956 | McDuffie | 123/191 M |
| 2,791,996 | 5/1957 | Trevarthen | 123/191 M |
| 2,810,377 | 10/1957 | Weissenbach | 123/191 M |
| 2,826,184 | 3/1958 | McDuffie | 123/191 M |
| 2,827,892 | 3/1958 | McDuffie et al. | 123/191 M |
| 2,843,103 | 7/1958 | Wyczalek | 123/191 M |
| 2,872,909 | 2/1959 | Stout | 123/191 M |
| 2,990,819 | 7/1961 | Bouvy | 123/191 M |
| 3,799,140 | 3/1974 | Vogelsang et al. | 123/191 S |
| 4,182,279 | 1/1980 | Sato et al. | 123/191 S |

FOREIGN PATENT DOCUMENTS

| | | | |
|---|---|---|---|
| 2501518 | 7/1976 | Fed. Rep. of Germany | 123/193 CP |
| 1233216 | 10/1960 | France | 123/191 M |

OTHER PUBLICATIONS

Morrell et al.; "Oliver's New 1800 Tractor Engine"; SAE Journal vol. 69, No. 10, Oct. 1961; pp. 62–68.

*Primary Examiner*—Craig R. Feinberg
*Attorney, Agent, or Firm*—Wm. R. Price

[57] ABSTRACT

Internal combustion engine with one or more compression gap zones between piston and cylinder head at each side of a reduced size combustion chamber, and deflection means in the combustion chamber through which unidirectional rotary flow is induced in the fuel charge.

4 Claims, 4 Drawing Figures

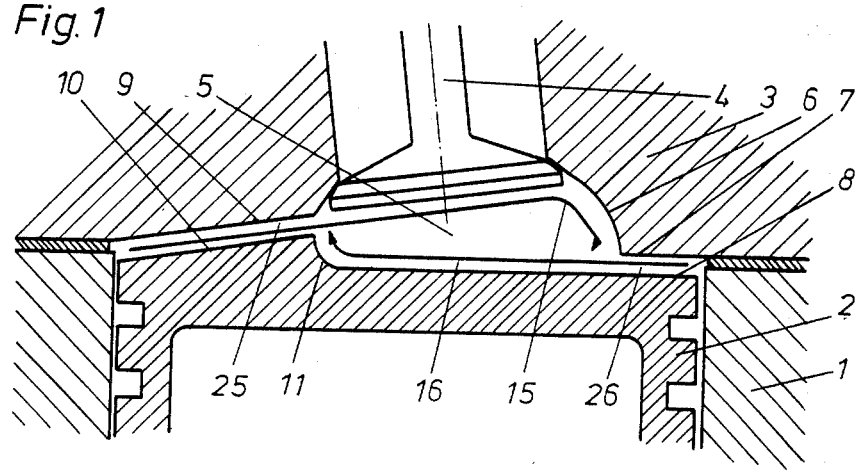
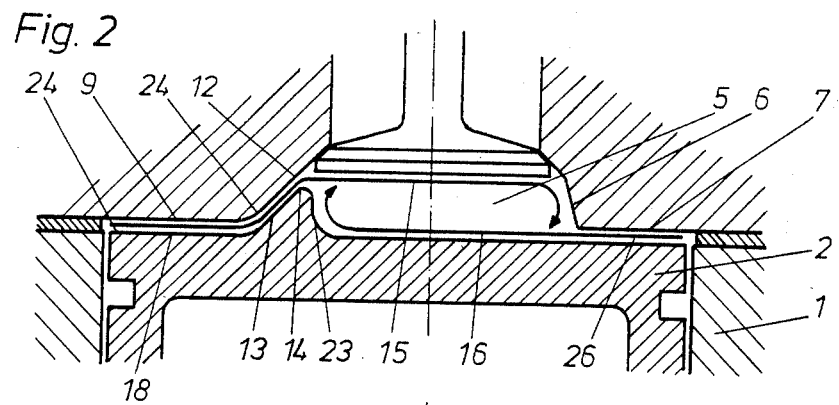
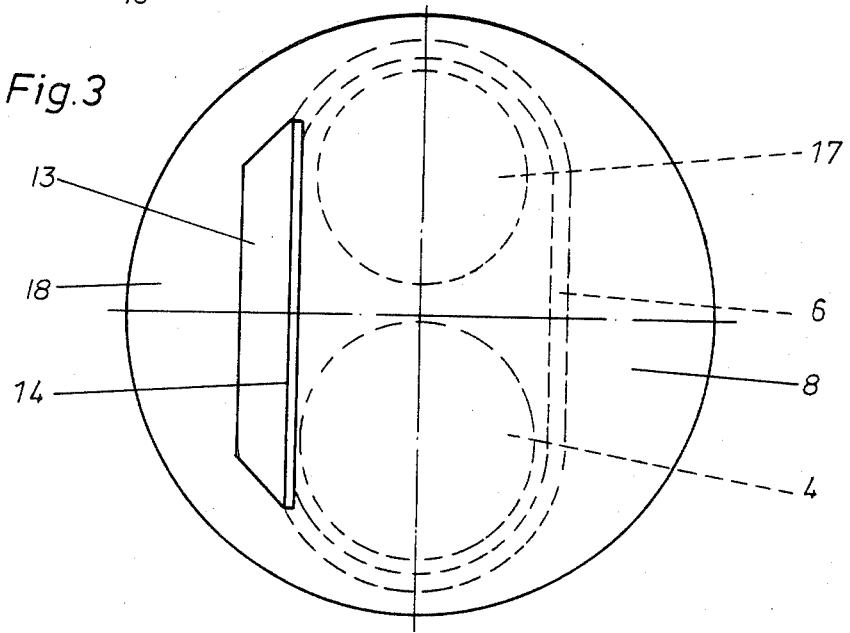

INTERNAL COMBUSTION ENGINE WITH ONE OR MORE COMPRESSION CAPS BETWEEN PISTON AND CYLINDER HEAD AND DEFLECTION MEANS IN THE COMBUSTION CHAMBER THROUGH WHICH ROTARY FLOW IS INDUCED IN THE CHARGE

CROSS-REFERENCE TO RELATED INVENTION

This is a continuation of my earlier filed application, Ser. No. 855,690, filed on Nov. 29, 1977 now abandoned for "INTERNAL COMBUSTION ENGINE."

BACKGROUND OF THE INVENTION

The invention relates to a type of combustion chamber ensuring high output, optimum fuel utilization and particularly low HC formation, besides very low CO and NOx figures. In order to achieve high output through good volumetric efficiency, the chamber below the valves must be empty also in the piston's upper dead center and must have no narrow channels to the combustion chamber. At the end of the expulsion of the waste gases and at the beginning of the attraction of a new gas mixture, the piston is in the area of the upper dead center. This means that the valves and the surface connecting both valves in the cylinder head must form a wall of the combustion chamber.

Another reason for this high output is that low CH values are attainable only if the combustion chamber is compact and has no fissured parts or channels such as from the combustion chamber to the valves. Thus it is also for this very important reason that one wall of the combustion chamber must consist of the two valves and the surface between them in the cylinder head.

The sole, but very important significance of the other design features of the combustion chamber, besides the deflection means for a rotary flow, is to be as compact as possible. The smaller the combustion chamber area relative to the volume, the better the fuel utilization and the smaller the HC percentages. It is precisely the specification of very low HC content in the exhaust gases in the future exhaust gas standards which constitutes the biggest problem, to be solved without costly and fuel-consuming measures such as afterburning or catalyst. Such alternate measures increase the cost of the engine by 20 to 25 percent and increase fuel consumption by 10 to 20 percent.

These figures indicate the importance and significance of the necessity of an absolutely compact combustion chamber, one wall of which is formed by the two valves and the surface between them.

Combustion chambers of this type are known. But in their present form they are still not in a position to bring about optimal exhaust gas and fuel consumption figures. In intermittent service, fuel with an octane rating ROZ=100 makes possible unobjectionable operation up to lambda 1.2 max. only, wherein NO is still very high at this setting. It is only at lambda 1.3 to 1.4 that NO drops far enough for these figures to be very low also.

It is an object of the invention to improve this compact combustion chamber through further measures so that CO and NO are reduced further; that the low HC is not increased, but rather decreased also, lowering fuel consumption and improving the output at the same time.

SUMMARY OF THE INVENTION

The invention is characterized in that a fuel charge flow, discharging on the upper piston surface from the mutually opposite compression gap zones in the area of the upper dead center of the piston, is deflected to the valves and the upper side of the combustion chamber, respectively, the upper piston surface forming the lower side or wall of the combustion chamber to create a unidirectional rotational whirling of the fuel mixture.

DESCRIPTION OF THE DRAWINGS

The invention is described below in greater detail in three modifications.

FIG. 1 shows a fragmentary cross-sectional elevation view of the intake duct with valve and piston according to the invention.

FIG. 2 shows a second embodiment with a slightly modified combustion chamber design.

FIG. 3 is a top view of the piston according to FIG. 2 in the overhead position of the valves and a part of the combustion chamber sidewall being shown in dotted lines.

Figure 4:
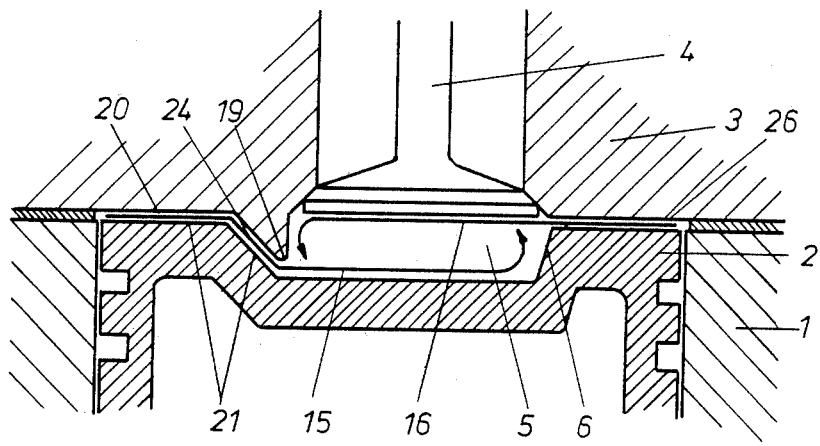
FIG. 4 shows a third embodiment with the combustion chamber according to the invention located in the piston.

The piston 2 moves in the cylinder 1. The intake valve 4 and the exhaust valve 17 are located in the cylinder head 3. The combustion chamber 5 is formed by the two valves and the surface between them in the cylinder head 3 as the upper wall, and a portion only of the upper piston surface as the lower wall. The cylinder head surface 6 forms one a right sidewall ridge. The other left sidewall of combustion chamber 5 is formed by the piston ridge protrusion 11 in FIG. 1 or 14 in FIG. 2. The right sidewalls 6 and the left sidewall piston protrusions 11, 14 are in close proximity below the valve surface so that the smallest possible combustion chamber results for this combustion chamber form. The lower surface 7 of the cylinder head 3 and the upper surface 8 of the piston 2 form the right hand compression gap zone 26 in the piston's upper dead center range.

The lower surface 9 of the cylinder head and the upper surface 10 of the piston form the left hand compression gap zone 25 according to FIG. 1. In the design according to FIG. 2, left hand compression gap is formed by horizontal surfaces 9 and 18 and the complementary inclined surfaces 12 of the cylinder head and 13 of the piston.

The operation mode of the internal combustion engine is as follows:

The fuel/air mixture is sucked into the cylinder 1 through the open intake valve 4. During compression, in the upper range of the piston travel, the mixture is pushed by the piston into the combustion chamber 5 due to a compression effect at the right and left sides of the combustion chamber. While the right hand flow travels along the upper piston surface 8 in the direction of arrow 16 into the lower part of the combustion chamber, the left hand flow travels along the lower edge of the valves 4 and 17 in the direction of arrow 15 into the upper part of the combustion chamber. The lower flow is deflected upwardly by the piston protrusion 11, and the upper flow is deflected downwardly by the combustion chamber right sidewall 6. This imparts to both flows a unidirectional rotary motion in the wall area of the combustion chamber.

FIG. 1 involves a trough type combustion chamber with inclined intake and exhaust valves. The piston is shown just before it reaches its upper dead center position.

FIG. 2 shows a second embodiment that involves a trough type combustion chamber with vertically disposed valves. In it, the left hand compression gap could also be designed as in FIG. 1, with flat inclined surfaces. Another design is shown. The left hand compression gap is first horizontal between the surfaces 9 and 18 to then bend upwardly between the inclined surfaces 12 and 13. It is of advantage for the gap to widen somewhat towards its exit at the left sidewall piston protrusion 14 so as to reduce the discharge resistance of the compressed mixture into the combustion chamber 5. The protrusion, in turn, must not form a wide gap because otherwise greater amounts of mixture than necessary will remain, leading to poorer combustion and more HC formation. This measure is very important and of particular significance because otherwise the low HC figures prescribed by law will not be attained without additional costly and fuel-consuming measures. As already explained, such measures would make the engine 20 to 25 percent more expensive and cause fuel consumption to increase by more than 10 percent.

FIG. 4 shows a third embodiment of the invention where the combustion chamber 5 is located as a recess in the top of the piston 2. The mixture is pushed out of the right hand compression gap zone 26 in the direction of arrow 16 below the valve 4 in the upper part of the combustion chamber 5 and the flow is deflected downwardly by the protrusion 19 on the underside of the cylinder head 3. The mixture from the left hand compression gap 24 is deflected downwardly by the left sidewall protrusion 19 and corresponding shape of the piston 2 opposite the protrusion 19 and flows in the lower part of the combustion chamber 5 to the right sidewall 6 where the flow is deflected upwardly by the right combustion chamber wall in the piston. The deflection protrusion 19 in this embodiment is located on the cylinder head 3.

This rotary flow of the combustion mixture brings further advantages:

1. Due to the complete homogenization of the mixture in conjunction with the outflow of rich and lean zones in the mixture, completely uniform combustion with a higher knock limit is brought about. The compression ratio can be increased from 1:9.5 to 1:11 for high test gasoline, one point less for regular gasoline. This alone brings with it lower fuel consumption, combined with increased efficiency.

2. The higher compression ratio and the homogenization of the mixture afford perfect operation in the lambda 1.3 to 1.4 range. Without the rotary flow and increased compression ratio this operation is possible only up to lambda 1.2. The NO formation at lambda 1.2 is four times greater than at lambda 1.35. Accordingly, the higher compression ratio made possible by the rotary flow is necessary to be able to lower the NO figures to what is required by law.

3. Operation with a higher compression ratio and rotary flow combustion chamber create the conditions for perfect operation with lean mixtures, whereby not only consumption was reduced further but also the CO percentage in the exhaust gas dropped to the acceptable level prescribed by law.

The following values were measured in the Europe Test Type I (ECE):

|  | Regular Comb. Chamber | Turbulance Comb. Chamber | Requirements 1982 |
| --- | --- | --- | --- |
| CO | 56.9 g/test | 18.25 g/test | 30 g/test |
| HC (FID) | 8.2 g/test | 5.7 g/test | 6 g/test |
| NOx | 4.1 g/test | 3.6 g/test | 4 g/test |

Fuel consumption was reduced by about 10 percent, and the output of the test car with 1.6 liter engine was increased from 110 HP to 124 HP.

The 1.6 liter HONDA engine is rated at 68 HP. This is mentioned for comparison with other exhaust gas solutions which are more expensive.

Only a combustion chamber having all the features enumerated here brings about the engine which meets the exhaust gas specifications of 1982 without additional measures while lowering fuel consumption and increasing the power at the same time. Even small changes in shape and operating mode of the combustion chamber deny the 1982 exhaust gas standards prescribed by law, in conjunction with the other advantages mentioned.

What is claimed is:

1. An internal combustion engine cylinder construction for providing a vertically oriented rotational swirl of a gas fuel charge in a combustion chamber immediately before ignition thereof, comprising:

(a) an engine cylinder having a reciprocable piston disposed therein and closed at its upper end by a cylinder head having side-by-side intake and exhaust valves, (b) a recessed, oval-shaped combustion cavity disposed between the head of the engine and the top of the piston, and having a flat upper surface including the intake and exhaust valve surfaces and the area between them, and a flat opposing bottom surface on the top of the piston defined by a left and right sidewall and having substantially semicircular ends aligned with the outer circular periphery of the valves and connected by opposite sidewalls, (c) two opposed compression gap zones disposed between the head and the upper surface of the piston, one compression zone disposed on each side of the combustion cavity and adjacent one of said left and right sidewalls and connecting with the interior of the combustion cavity when the piston at the upper end of its travel approaches the cylinder head so as to force the charge into the combustion chamber in opposite opposed directions immediately prior to the piston reaching the top of the cylinder, (d) the piston having a first upwardly extending ridge which forms one of said left and right sidewalls of the combustion chamber, and the head having a second corresponding downwardly extending ridge forming the other of said left and right sidewalls, (e) one compression gap zone opening into the combustion chamber adjacent and in line with the piston surface, and which acts to force the incoming charge around the second downwardly extending ridge on the head and across the flat bottom surface on the piston in a stream to the opposed first upwardly extending ridge on the piston which is on the opposite side of the combustion chamber, where it is deflected upwardly along that first ridge away from the piston surface, (f) the other compression gap zone opening into the combustion chamber adjacent and in line with the closed valve surfaces and which acts to force the incoming charge around the first upwardly extending ridge on the piston and across the valve surfaces to the second downwardly extending ridge on the head which is on the opposite side of the combustion chamber, where it is deflected downwardly along that second ridge and away from the valve surfaces, and (g) the opposed flows from the compression gap zones flowing clear of each other over their adjacent flat surfaces thereby imparting an overall rotational swirl of the charge in the combustion chamber as the piston approaches the top of the cylinder.

2. An internal combustion engine according to claim 1 wherein the said intake and exhaust valves (4, 17) are inclined to the longitudinal axis of the bore of the cylinder, and the said second compression gap zone is generally flush with the upper surface of the combustion chamber.

3. An internal combustion engine according to claim 2 wherein the right sidewall of the combustion chamber resulting from the inclination of the valves is of arcuate shape to direct the fuel mixture downwardly.

4. An internal combustion engine according to claim 2 wherein the faces of said intake and exhaust valves and the second compression gap zone are inclined about 15° to the transverse axis of the cylinder bore.

* * * * *

UNITED STATES PATENT AND TRADEMARK OFFICE
CERTIFICATE OF CORRECTION

PATENT NO. : 4,565,181
DATED : January 21, 1986
INVENTOR(S) : Paul C. August

It is certified that error appears in the above-identified patent and that said Letters Patent is hereby corrected as shown below:

Title, line 2, "CAPS" should read --GAPS--.

Signed and Sealed this

Twelfth Day of August 1986

[SEAL]

Attest:

DONALD J. QUIGG

Attesting Officer

Commissioner of Patents and Trademarks